United States Patent [19]

Morando

[11] Patent Number: 5,549,393
[45] Date of Patent: Aug. 27, 1996

[54] SELF-ALIGNING BEARING FOR HIGH TEMPERATURE APPLICATIONS

[75] Inventor: Jorge A. Morando, Grosse Ile, Mich.

[73] Assignee: Alphatech, Inc., Trenton, Mich.

[21] Appl. No.: 370,311

[22] Filed: Jan. 9, 1995

[51] Int. Cl.$^6$ ............................................. F16C 23/04
[52] U.S. Cl. ..................... 384/203; 384/208; 384/213; 384/297; 384/907.1
[58] Field of Search ............................ 384/203, 204, 384/205, 206, 207–214, 145–146, 297, 907.1

[56] References Cited

U.S. PATENT DOCUMENTS

| | | | |
|---|---|---|---|
| 4,026,657 | 5/1977 | Chmura | 384/203 |
| 4,844,627 | 7/1989 | Speakman | 384/208 |
| 5,113,104 | 5/1992 | Blaettner et al. | 384/210 |
| 5,281,033 | 1/1994 | Ide | 384/213 |

Primary Examiner—Lenard A. Footland
Attorney, Agent, or Firm—Charles W. Chandler

[57] ABSTRACT

A steel mill roll has its ends supported in self-aligning bearings that do not require a liquid or grease lubricant, and which are capable or operating at roll shaft temperatures up to 1500° F.

7 Claims, 2 Drawing Sheets

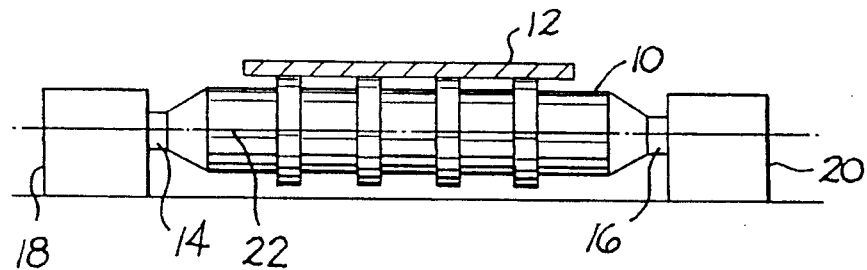
FIG. 1
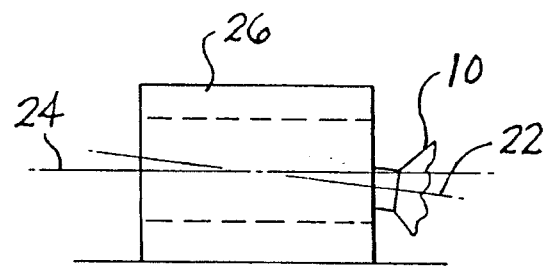
FIG. 2
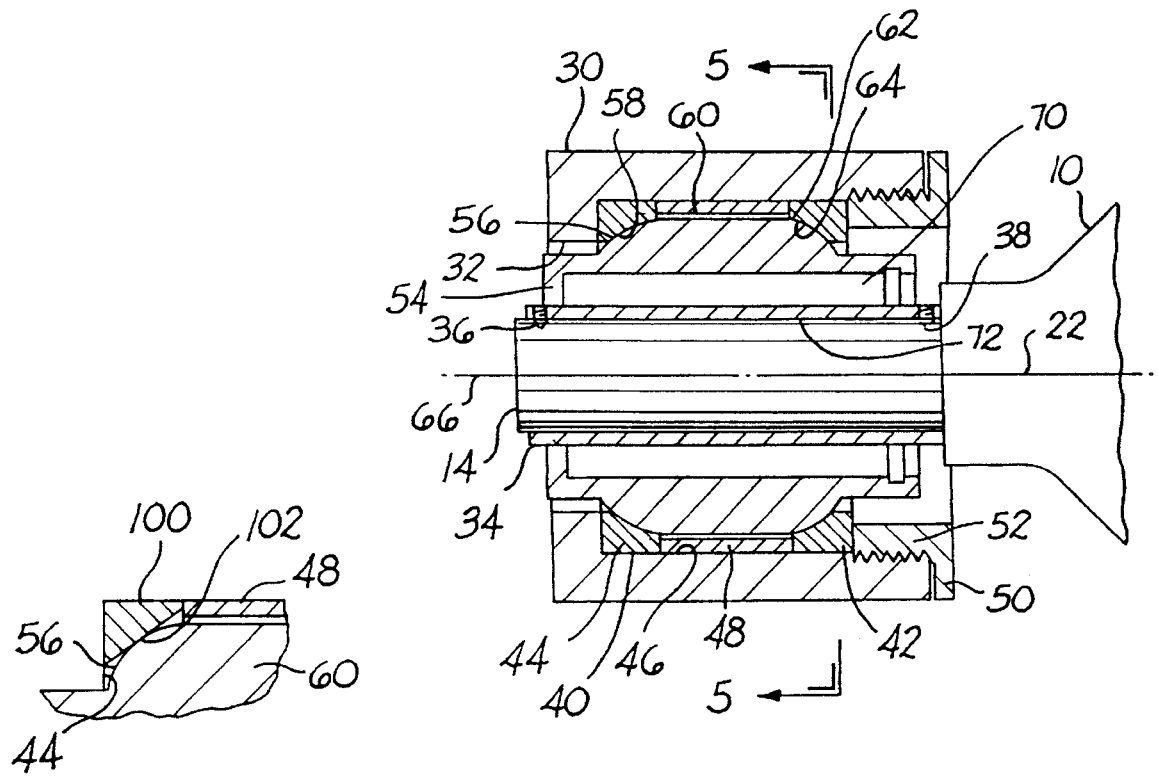
FIG. 4
FIG. 3

SELF-ALIGNING BEARING FOR HIGH TEMPERATURE APPLICATIONS

BACKGROUND OF THE INVENTION

This invention is related to bearing means for high temperature applications, and more particularly to a bearing useful for supporting a steel mill roll transferring a hot steel strip.

Rolls are used in steel mills for transferring hot strips of steel in an environment where the strip may be 1800° F. to 2200° or more. The roll and the supporting bearings become very hot. The temperature varies substantially as the furnace is opened and closed.

Roller bearings are commonly used for such applications. Each bearing supports a short shaft that extends from each end of the roll.

Roller bearings have a relatively limited life for several reasons. One reason is that the rollers in the bearing are mounted between an inner race and an outer race. Since the diameter of the inner race is less than the diameter of the outer race, the rollers must slide in one direction on the inner race or in the opposite direction on the outer race. The sliding develops facets in the races, requiring the rollers to jump over each facet, and causing the rolls to vibrate. This is sometimes referred to as "skidding wear".

When the rollers are started, they are dry and hot, that is 400°–600° F. Rollers formed of a hard steel tend to corrode because of the high operating temperature. Other materials, such as stainless steel are too soft and tend to gall.

The steel strip load tends to flex the roll. The flexing roll causes each end shaft to shift slightly in its bearing. Roller bearings have a low tolerance for such shifting. Flexing also occurs when the roll returns to its original shape as it is unloaded. This is a vertical flexing. In some cases, a horizontal flexing occurs because some of the rolls may be rotating slower than others. A steel strip pushing a slower roll forward, causes a forward horizontal flexing. A reverse horizontal flexing takes place when the roll velocity is higher than the strip velocity.

Still another problem is caused by inadequate bearing lubrication. High temperature lubricants are commonly used, however, they tend to cake-up. Maintenance personnel try to pump out the caked-up lubricant and replace it with new lubricant.

Usually when the roll stalls due to a bearing failure, the roll is distorted. Frequently an expensive roll is lost because of a relatively, short-lived, less expensive bearing.

SUMMARY OF THE INVENTION

The broad purpose of the present invention is to provide an improved combination steel mill roll and bearing, and a self-aligning bearing useful for high temperature rolls, that does not require lubrication, will accommodate roll flexing, and is effective at high temperatures such as 1000° F.

The preferred embodiment of the invention comprises a bearing housing having an opening larger than the diameter of the roll shaft. A pair of axially-spaced rings are mounted in the housing. Each ring has a concave, partially spherical bearing surface.

A bronze sleeve having an outer surface with a convex partially spherical configuration slidably engages the concave bearing surfaces of the two rings in such a manner that the sleeve can swing from a horizontal position in the bearing housing. The bronze sleeve is shrink-fitted over a graphite sleeve, forming a unitary structure. The graphite sleeve is formed of a high temperature extremely hard graphite material, and is slidably mounted on the roll shaft. Thus, the composite sleeve provides a large bearing surface as the shaft is rotating, and accommodates a swinging motion of the shaft as the roller flexes under the load of a moving strip.

In one embodiment of the invention, the shaft is of a relatively soft steel. A hard steel sleeve is mounted over the shaft which in turn slidably engages the graphite sleeve.

The invention is also useful in applications where the bearing may be immersed in a zinc or aluminum bath.

Still further objects and advantages of the invention will become readily apparent to those skilled in the art to which the invention pertains upon reference to the following detailed description of the drawings.

DESCRIPTION OF THE DRAWING

The description refers to the accompanying drawings in which like reference characters refer to like parts throughout the several views, and in which:

FIG. 1 is a view of a steel mill roll supporting a steel strip with the ends of the roll mounted in the preferred self-aligning bearings;

FIG. 2 is a schematic view illustrating how the shaft axis becomes misaligned with the bearing axis as the roll flexes;

FIG. 3 is an enlarged sectional view of a preferred bearing;

FIG. 4 is a view showing an alternative self-aligning ring;

DESCRIPTION OF A PREFERRED EMBODIMENT

Figure 5:
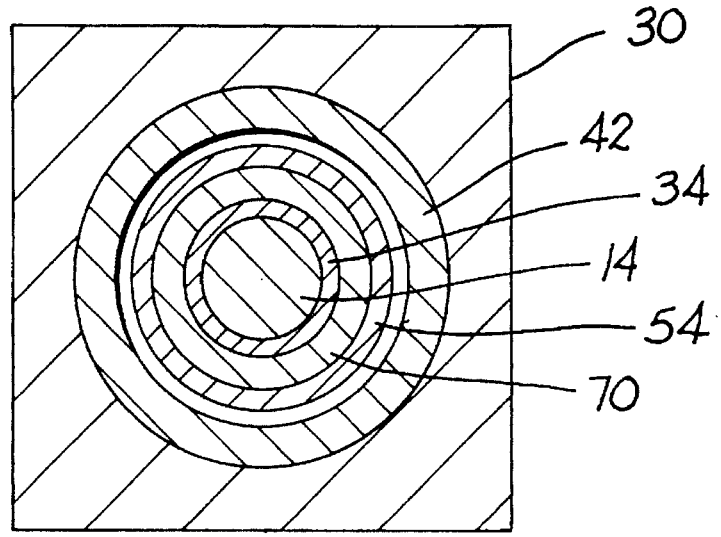
FIG. 5 is a view as seen along lines 5—5 of FIG. 3.

Referring to the drawings, an annealing roll 10 for transferring a steel strip 12 from an annealing furnace (not shown) has a pair of shaft ends 14 and 16 rotatably mounted in self-aligning bearing means 18 and 20, respectively. Roll 10 may be of the type illustrated in my U.S. Pat. No. 5,338,280 issued Aug. 16, 1994 for "Annealing and Tunnel Furnace Rolls".

As is well known, the weight of strip 12 tends to flex or bow the roll. This is a dynamic flexing since the roll is rotating. Consequently, axis 22 of the roll will tend to become misaligned with respect to the fixed axis 24 of bearing 26. This misalignment is exaggerated in FIG. 2 in order to emphasize the misalignment problem. Conventional roller bearings will not readily accommodate such misalignment. Their life is shortened because the bearing contact between the shaft and the bearing is concentrated on a reduced bearing area.

Bearings 18 and 20 are identical except for a right and left hand relationship. Bearing 18 is illustrated in FIG. 3 and comprises a steel housing 30 having an opening 32 for receiving shaft 14 of roll 10. Shaft 14 is made of a relatively soft stainless steel, because it cannot be brittle. To provide a hard bearing surface, a steel sleeve 34 is mounted over shaft 14 and held in place by set screw means 36 and 38. The set screws are fastened into recessed openings in the sleeve to engage the shaft. Thus, sleeve 34 rotates with the shaft.

A pair of heat treated steel ($R_c50/60$) bearing rings 40 and 42 are mounted in the bearing opening. The bearing opening has an internal shoulder 44, which extends radially inwardly from an internal cylindrical surface 46. Bearing ring 40 is seated against shoulder 44. Both rings are mounted in sliding contact with cylindrical surface 46.

A cylindrical centering sleeve 48 is mounted between ring 40 and ring 42. An annular nut 50 is threadably mounted at 52 at the right end of the bearing opening as viewed in FIG. 3. The nut is tightened to urge ring 42, sleeve 48 and ring 40 toward shoulder 44 to align their bearing surfaces and to prevent their rotation in the housing.

An annular bronze retainer 54 is mounted in the bearing opening and has a convex, partially spherical annular bearing surface 56, slidably engaging a partially spherical annular concave slidable bearing surface 58 of bearing ring 40. The retainer has an intermediate cylindrical section 60 with a diameter slightly less than the internal diameter of the centering sleeve. The retainer has a second partially spherical annular convex bearing surface 62 slidably engaging a concave annular partially spherical bearing surface 64 on the inside of bearing ring 42. The retainer can be swung laterally with respect to the fixed axis 66 of the bearing.

A graphite sleeve 70 is attached to retainer 54, preferably by having the retainer shrink-fitted around the sleeve. The sleeve has an inner cylindrical surface 72 rotatably slidably engaging the outer cylindrical surface of sleeve 34.

Graphite sleeve 70 has good operating characteristics up to 1500° F. It is formed of an extruded, compressed dense graphite formed in a pyrolitic process, or of carbon/graphite in a mechanical process.

The axis 22 of the roll is shown in FIG. 3 as aligned with axis 66 of the bearing, however, the internal bearing components will slidably shift with the roll shaft as the roll flexes. Consequently, the axis of the shaft is always aligned with the axis of the sliding components of the bearing, that is, graphite sleeve 70 and bearing rings 42 and 44. The bearing is effective at high steel-mill temperatures and does not require lubrication. It has a substantially greater life than roller bearings because the shaft has a substantial bearing surface slidably engaging the graphite sleeve in all flexed positions of the shaft.

FIG. 4 illustrates an alternative bearing ring 100 which is identical to ring 40, except that it has an internal concave frusto-conical annular bearing surface 102 instead of the internal spherical surface 58 of ring 40. The companion bearing ring can also have a frusto-conical concave surface engaging the opposite end of the retainer.

Figure 6:
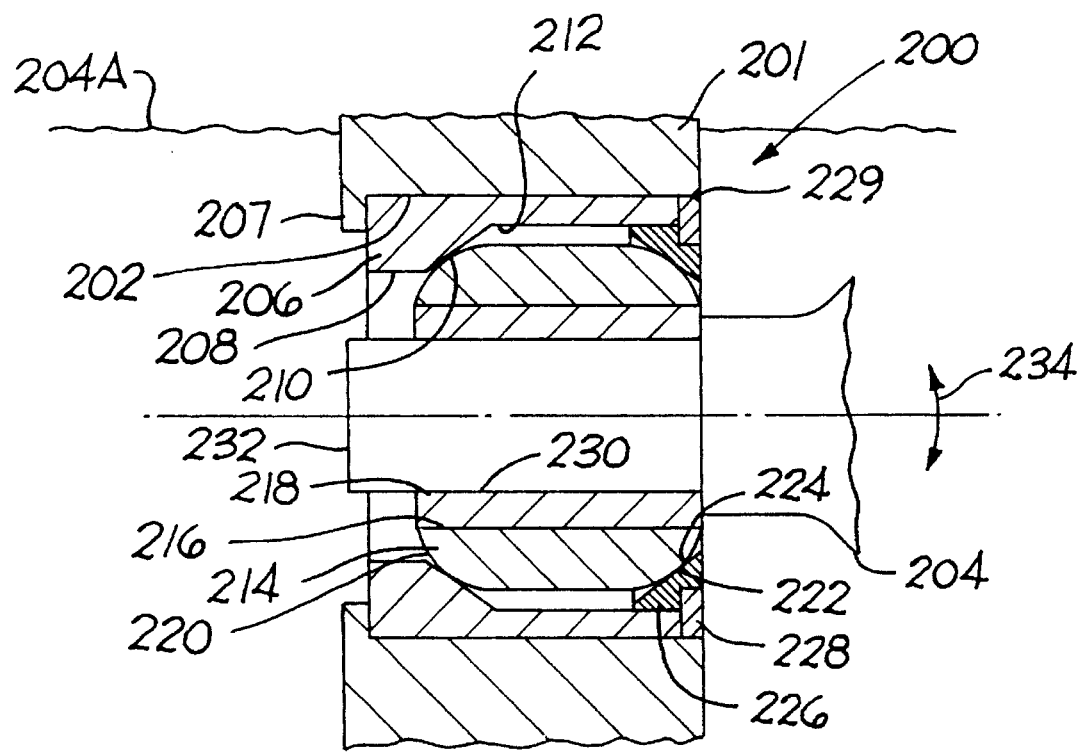
FIG. 6 shows an alternative self-aligning bearing illustrating the invention.

FIG. 6 illustrates another embodiment of the invention in which bearing 200 is supported by a hanger 201 having an internal cylindrical opening 202. This application is useful for an environment in which roll 204 and the bearing are immersed in a metal bath 204A, such as aluminum, if appropriate material changes are made to prevent molten metal corrosion attack.

A sleeve 206 made from cast iron, 52100 steel or stainless steel is seated against an annular shoulder 207 inside a cylindrical opening 202. Sleeve 206 has an annular shoulder 208, a frusto-conical concave annular bearing shoulder 210 and a cylindrical surface 212.

An annular retainer 214, also made from Stellite or 316L stainless steel, has a cylindrical inner surface 216 shrink-fitted over ceramic sleeve 218. Sleeve 218 can also be made of cast iron or 52100 steel. Retainer 214 has a partially spherical annular convex shoulder 220 slidably engaging bearing surface 210. The opposite end of the retainer has a partially spherical annular convex surface 222 slidably engaging an annular concave frusto-conical surface 224 of a bearing ring 226. Bearing ring 226 is spaced from shoulder 210 and preferably is retained in the bearing opening by a retainer ring 228 which is welded at 229 to hanger 201. The inner surface 230 of sleeve 218 slidably engages the rotating shaft 232 of roll 204.

In this case, retainer 214 and sleeve 218 are movable together as a composite bearing component, with the sleeve providing a low-friction sliding surface for the shaft, while the convex spherical surfaces of the retainer provide a self-aligning sliding fit with respect to sleeve 206. Thus, the bearing accommodates both the rotating load of the shaft as well as the flexing load of the steel strip as the shaft swings up and down in the direction of arrows 234. The opposite end of the roll has a similar bearing so that the roll is suspended between two self-aligning bearings.

Having described my invention, I claim:

1. A combination roll and bearing assembly useful for transferring a heated steel strip from a first position toward a second position, comprising:

a roll having a length suited for supporting a steel strip as the roll is being rotated about a first axis of rotation, the roll having a first end and a second end;

a first shaft means having a bearing supported end extending axially from the first end of the roll and attached thereto, and a second shaft means having a bearing supported end extending axially from second end of the roll and attached thereto, both of the shaft means having an axis of rotation;

a self-aligning bearing means supporting each of the shaft means, each bearing means including:

a housing;

first annular bearing structure movably mounted in the housing and having a cylindrical inner surface of a low friction material slidably mounted on the shaft means, and an outer surface having an annular partially spherical bearing surface disposed around the bearing-supported end of the associated shaft means; and second annular bearing structure fixedly mounted in the housing and having a fixed bearing axis, and slidably engaging the annular partially spherical surface of the first bearing structure to permit the shaft means to rotate in the second bearing structure as the shaft swings within an acute angle with respect to the fixed axis of the second bearing structure.

2. A combination roll and bearing assembly as defined in claim 1, in which each of the shaft means includes a steel alloy sleeve removably mounted on the bearing-supported end of the shaft means so as to be rotatable therewith, the sleeve having a cylindrical outer bearing surface slidably, rotatably mounted in the first bearing structure.

3. A combination as defined in claim 1, in which the first bearing structure comprises a sleeve of a low friction material slidably, rotatably mounted on the shaft means, and annular retainer means carried with the low friction sleeve, the retainer means having a partially spherical convex annular bearing surface disposed around the low friction sleeve.

4. A combination as defined in claim 1, in which the housing has an internal annular shoulder, the second bearing structure comprising a pair of spaced bearing rings disposed in said housing, each of said rings having an annular concave bearing surface slidably engaging the first bearing structure, one of the pair of rings being disposed in abutment with said shoulder, an annular centering retainer disposed between said rings, and a nut threadably mounted in the housing opening to axially urge the pair of spaced bearing rings and the retainer toward said shoulder.

5. A combination as defined in claim 4, in which each of the pair of bearing rings has a concave, partially spherical bearing surface slidably engaging the first bearing structure.

6. A combination as defined in claim 4, in which each of the pair of bearing rings has a frusto-conical bearing surface slidably engaging the first bearing structure.

7. A combination as defined in claim 1, in which the shaft means permits the roll to swing laterally with respect to the axis of the second bearing structure.

* * * * *